United States Patent [19]

Harden, III et al.

[11] Patent Number: 5,386,873
[45] Date of Patent: Feb. 7, 1995

[54] COOLING SYSTEM FOR ENGINE-DRIVEN MULTI-STAGE CENTRIFUGAL COMPRESSOR

[75] Inventors: William H. Harden, III, Yadkinville; Daniel T. Martin, Clemmons; Devin D. Biehler, Mocksville, all of N.C.

[73] Assignee: Ingersoll-Rand Company, Woodcliff Lake, N.J.

[21] Appl. No.: 73,902

[22] Filed: Jun. 9, 1993

[51] Int. Cl.⁶ .................. F28D 1/00; B60K 11/04
[52] U.S. Cl. .................................. 165/47; 165/51; 165/140; 165/86; 165/77; 417/243; 417/313; 415/179
[58] Field of Search ............. 165/140, 47, 51, 86, 165/77; 417/243, 313; 415/179

[56] References Cited

U.S. PATENT DOCUMENTS

| | | | |
|---|---|---|---|
| 3,001,692 | 9/1961 | Schierl | 415/179 |
| 3,476,485 | 11/1969 | Kunderman | 415/179 |
| 3,658,442 | 4/1972 | Heitmann et al. | 415/179 |
| 4,889,180 | 12/1989 | Sloan | 417/243 |
| 4,916,902 | 4/1990 | Pratt et al. | 165/51 |
| 5,002,019 | 3/1991 | Klaucke et al. | 165/51 |
| 5,097,891 | 3/1992 | Christensen | 165/51 |
| 5,224,836 | 7/1993 | Gunn et al. | 417/14 |
| 5,234,051 | 8/1993 | Weizenburger et al. | 165/51 |
| 5,306,116 | 4/1994 | Gunn et al. | 415/27 |
| 5,310,020 | 5/1994 | Martin et al. | 184/63 |

*Primary Examiner*—John K. Ford
*Attorney, Agent, or Firm*—Victor M. Genco, Jr.

[57] ABSTRACT

An air cooling system for an engine driven, multi-stage compressor is provided which includes a fan means for providing a cooling airstream to the air cooling system and an engine radiator. An intercooler has a predetermined height dimension and receives heated, compressed, interstage air. An oil cooler has a predetermined height dimension which is substantially less than the height dimension of the intercooler. An aftercooler receives hot, compressed, final stage air. The intercooler, the oil cooler, the radiator, and the aftercooler are arranged in two banks, each bank comprising two cooling cores juxtaposed one to each other. The intercooler and the engine radiator define the first bank which is positioned substantially adjacent to the fan means to receive the coolest cooling airstream. The oil cooler and the aftercooler define the second bank which receives warmer cooling air which has first passed through the first bank. The oil cooler is positioned behind the intercooler and the aftercooler is positioned behind the radiator.

13 Claims, 5 Drawing Sheets

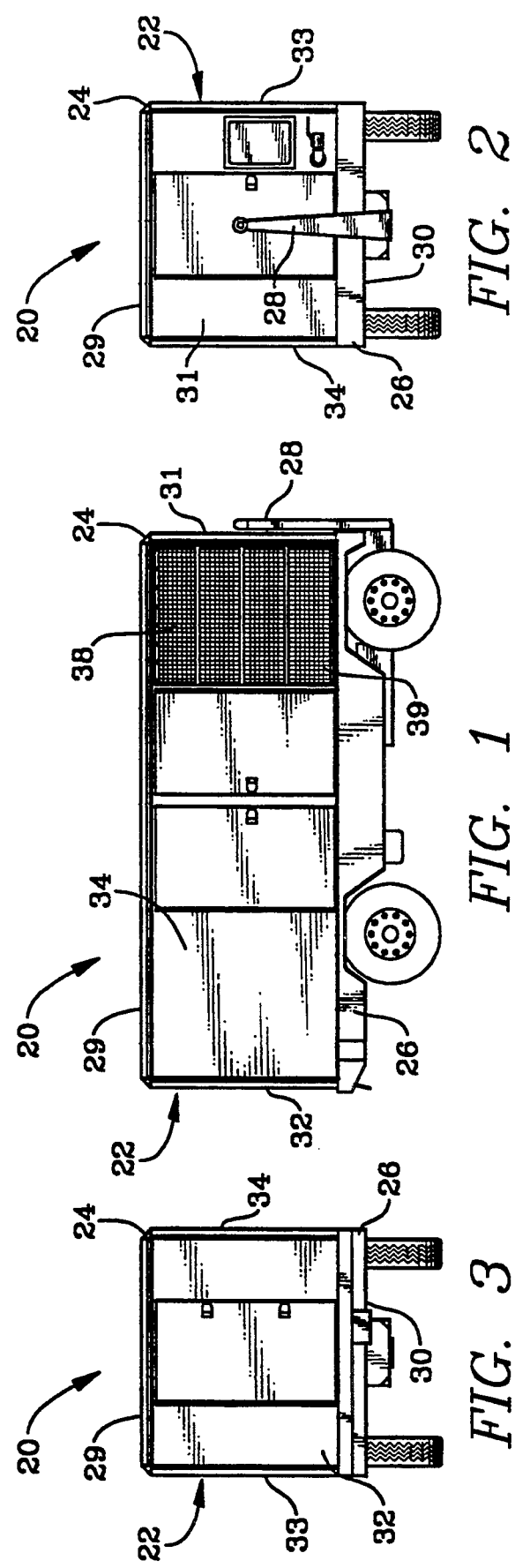

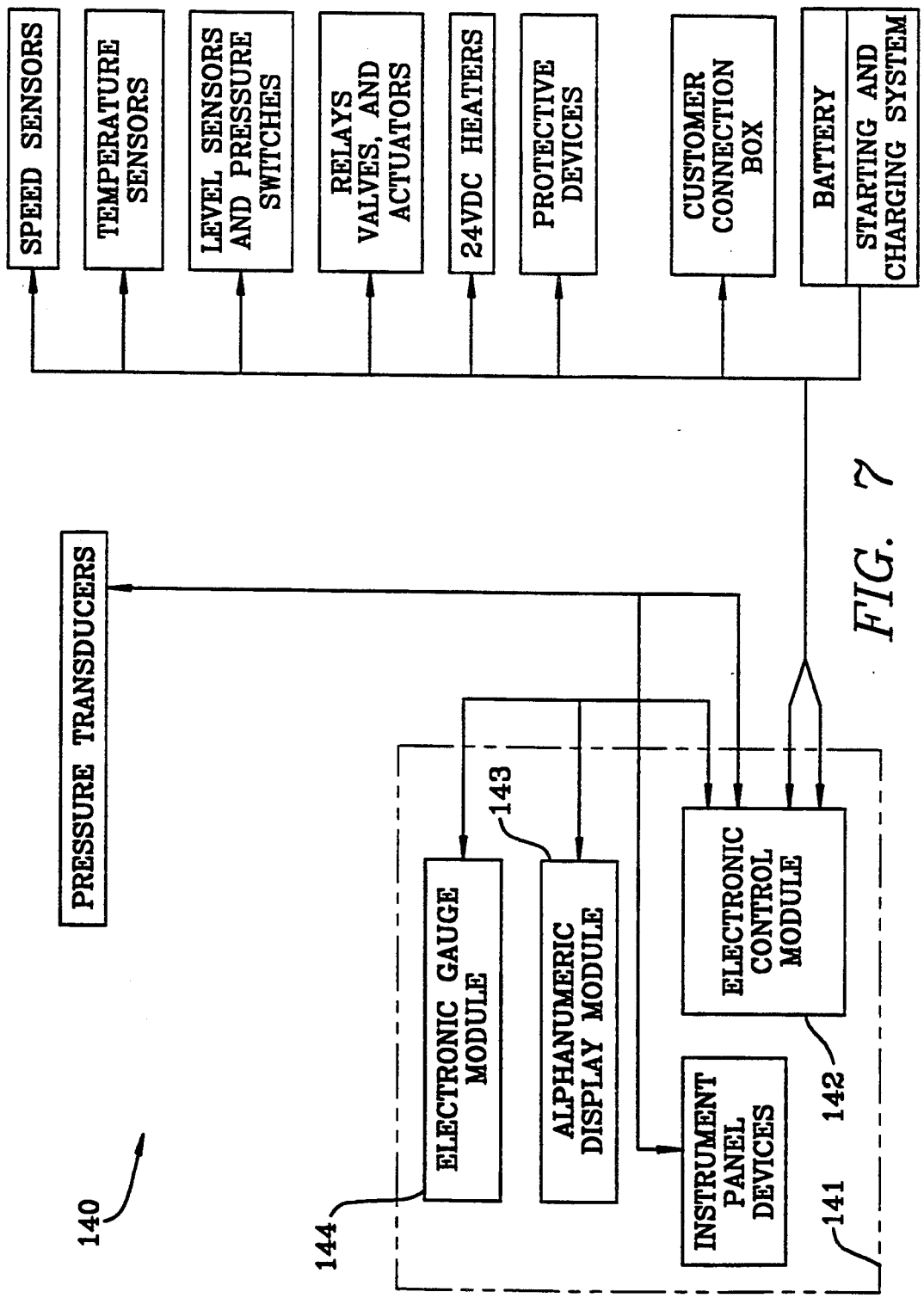

COOLING SYSTEM FOR ENGINE-DRIVEN MULTI-STAGE CENTRIFUGAL COMPRESSOR

BACKGROUND OF THE INVENTION

This invention generally relates to compressors, and more particularly to a cooling system for a portable, engine-driven compressor.

Water cooling systems are used with stationary centrifugal compressors because these cooling systems are extremely efficient, and usually lower the temperature of compressed air entering a second compressor stage to temperatures near or below ambient temperature. Additionally, water cooling systems are able to cool final stage compressed air to temperatures well below the temperatures required by industry. It is not uncommon for water cooling systems to cool final stage air to temperatures below 110° to 120° F. However, for a compressor to be truly portable, it must be air cooled, as opposed to liquid or water cooled, because water cooling typically is not available at remote locations. Also, in a portable compressor application, the machine must be able to operate in a wide range of ambient temperatures and altitudes. These portable compressors must be able to operate in temperatures ranging from minus 20° F. to temperatures of approximately 120° F.

To date, portable dry-screw compressors which have employed an air cooling system have only been able to cool final stage compressed air to temperatures of approximately 120° F. above ambient temperature. However, such final stage compressed air temperatures typically exceed the temperature requirements of industry. Therefore, in use, these air-cooled dry-screw compressors must employ an additional stand-alone aftercooler to supplement the main air cooling system of the dry-screw compressor. This of course is an additional expense for the user.

The foregoing illustrates limitations known to exist in present portable, engine-driven compressors. Thus, it is apparent that it would be advantageous to provide an alternative directed to overcoming one or more of the limitations set forth above. Accordingly, a suitable alternative is provided including features more fully disclosed hereinafter.

BRIEF DESCRIPTION OF THE DRAWING FIGURES

FIG. 1 is a side view of a portable, diesel-driven centrifugal compressor which includes the cooling system of the present invention;

FIG. 2 is a front view of the compressor illustrated in FIG. 1;

FIG. 3 is a rear view of the compressor illustrated in FIG. 1;

FIG. 7 is a block diagram of an electronic control system according to the present invention.

SUMMARY OF THE INVENTION

Figure 4:
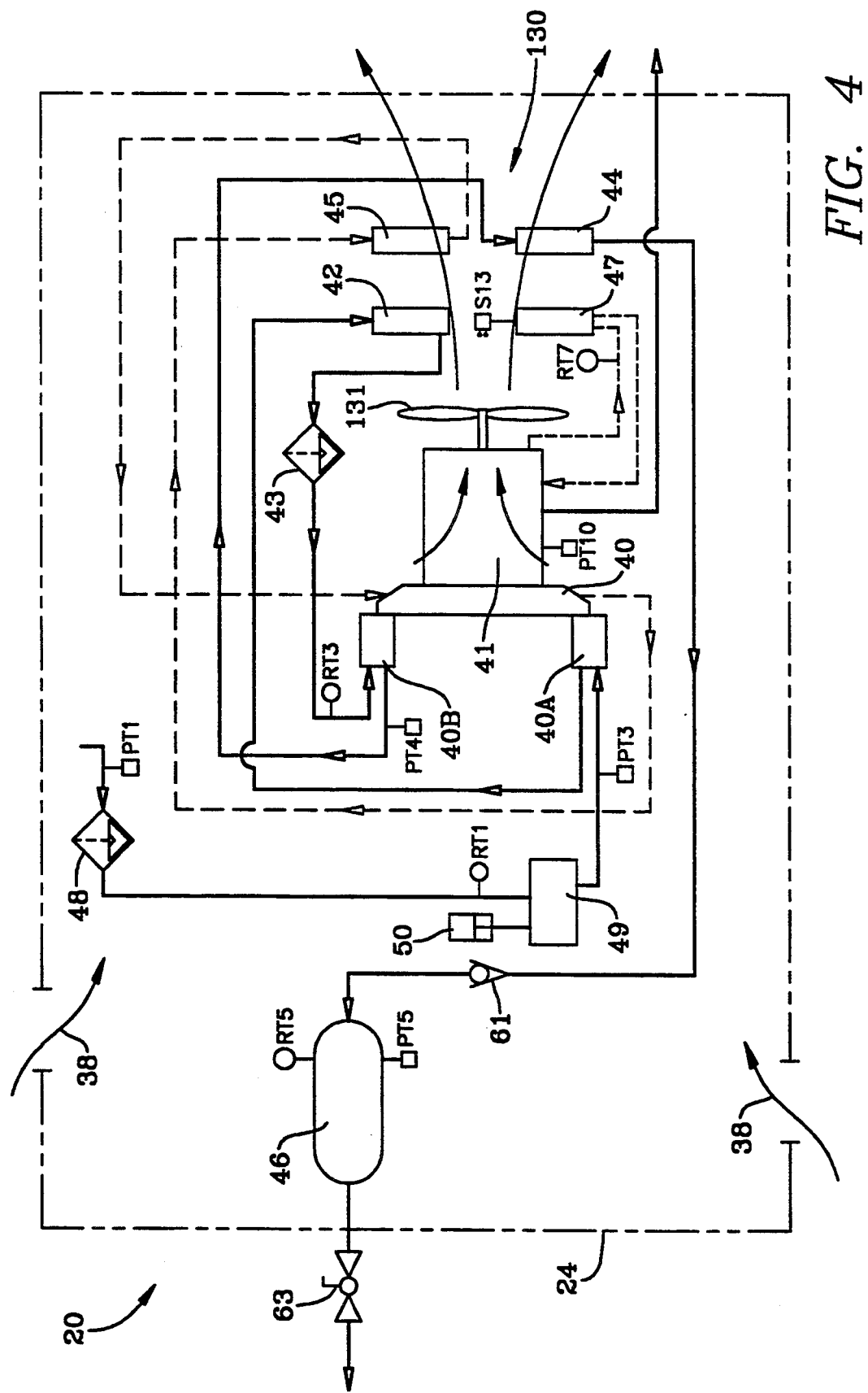
FIG. 4 is a functional schematic of a compressed air system according to the present invention.

In one aspect of the present invention, this is accomplished by providing an air cooling system for an engine driven, multi-stage compressor which includes an engine radiator and a fan for providing a cooling airstream to the air cooling system. An intercooler has a predetermined height dimension and receives heated, compressed, interstage air. An oil cooler has a predetermined height dimension which is substantially less than the height dimension of the intercooler. An aftercooler receives hot, compressed, final stage air. The intercooler, the oil cooler, the radiator, and the aftercooler are arranged in two banks, each bank comprising two cooling cores juxtaposed one to each other. The intercooler and the engine radiator define the first bank which is positioned substantially adjacent to the fan to receive the coolest cooling airstream, and the oil cooler and the aftercooler define the second bank which receives warmer cooling air which has first passed through the first bank. The oil cooler is positioned behind the intercooler and the aftercooler is positioned behind the radiator.

The foregoing and other aspects will become apparent from the following detailed description of the invention when considered in conjunction with the accompanying drawing figures.

DETAILED DESCRIPTION

Referring now to FIGS. 1-3, a portable, diesel-driven centrifugal compressor is generally illustrated at 20. Although the cooling system of the present invention is described in a centrifugal compressor package, it should be understood that the cooling system may be employed with any type compressor which employs an air cooling system, such as a portable, dry-screw compressor, for example.

The compressor 20 includes an upper compressor package portion 22 which is enclosed by a housing 24, and a full-chassis and running gear portion 26 which includes a tow bar assembly 28. The portable compressor 20 has a top portion 29, a bottom portion 30, a front portion 31, a rear portion 32, a left portion 33, and a right portion 34. An engine exhaust pipe outlet (not shown) and a cooling air exhaust area (not shown) are located at the rear of the top portion 29. A large ambient air intake 38 is located on each the left side and the right side of the housing. The ambient air intakes 38 are each covered by a protective grill 39 which prevents foreign debris from entering the interior of the compressor housing 24 during operation.

FIG. 4 is a functional schematic of a compressed air system of the compressor 20 having the following major system components: a two stage centrifugal compressor or airend 40, having a first stage 40A, a second stage 40B, and a casing (not shown); a prime mover 41, such as a diesel engine having a casing (not shown); an intercooler 42; a water separator 43; an aftercooler 44; an oil cooler 45; a receiver tank 46; and an engine radiator 47. These major system components will be described in further detail hereinafter. Although a two-stage centrifugal compressor or airend 40 is described herein, it is anticipated that the teachings of the present invention may apply equally to compressed air systems having one stage or more than two stages, as well.

The two stage centrifugal compressor 40 is driven by the diesel engine 41. Referring to FIG. 4, airend intake air is drawn from within the housing 24 and flows through an intake filter apparatus 48. The filtered intake air then flows through an inlet duct (not shown) to an inlet control valve 49, which in the preferred embodiment is a butterfly type valve operated by a pneumatically controlled positioner/actuator 50. The inlet control valve 49 is directly mounted on the airend first stage head, as is well known in the art. The inlet control valve 49 is used for pressure and capacity control and is dynamically controlled by a microprocessor based electronic controller.

The compressor 20 includes instrumentation fluidly disposed in the intake air path, upstream of the first stage 40A of the airend, namely, a pressure sensor PT1 fluidly disposed upstream of the air intake filters 48, sensor PT1 sensing ambient barometric pressure; a temperature sensor RT1 fluidly disposed upstream of the inlet control valve 49, sensor RT1 sensing stage 1 inlet temperature; and a pressure sensor PT3 which senses stage inlet vacuum.

Air entering the first stage 40A of the airend 40 is compressed to an intermediate predetermined pressure of approximately 35 PSIG. The air exits the first stage and flows through an interstage duct (not shown) to the intercooler 42 for cooling prior to entering stage two for final compression. Cooled and, usually, saturated interstage air then leaves the intercooler 42 and flows through the water separator 43 to the airend 40 for second stage compression. Instrumentation present within the interstage air path includes a temperature sensor RT3 which measures second stage inlet temperature.

Interstage air is compressed by the second stage 40B to a pressure equal to 3–4 PSI above a predetermined receiver tank pressure. The second stage compressed air exits the second stage 40B and flows through the afterstage discharge duct (not shown) to the aftercooler 44 for final cooling, and through a spring-loaded wafer-style check valve 61 to the inlet of the receiver tank 46. Compressed air is discharged out of the compressed air system through a service valve 63. Instrumentation which is present within the afterstage air path includes a pressure sensor PT4 which senses stage 2 outlet pressure, a pressure sensor PT5 which senses receiver tank pressure, and a temperature sensor RT5 which senses receiver tank temperature.

Figure 5:
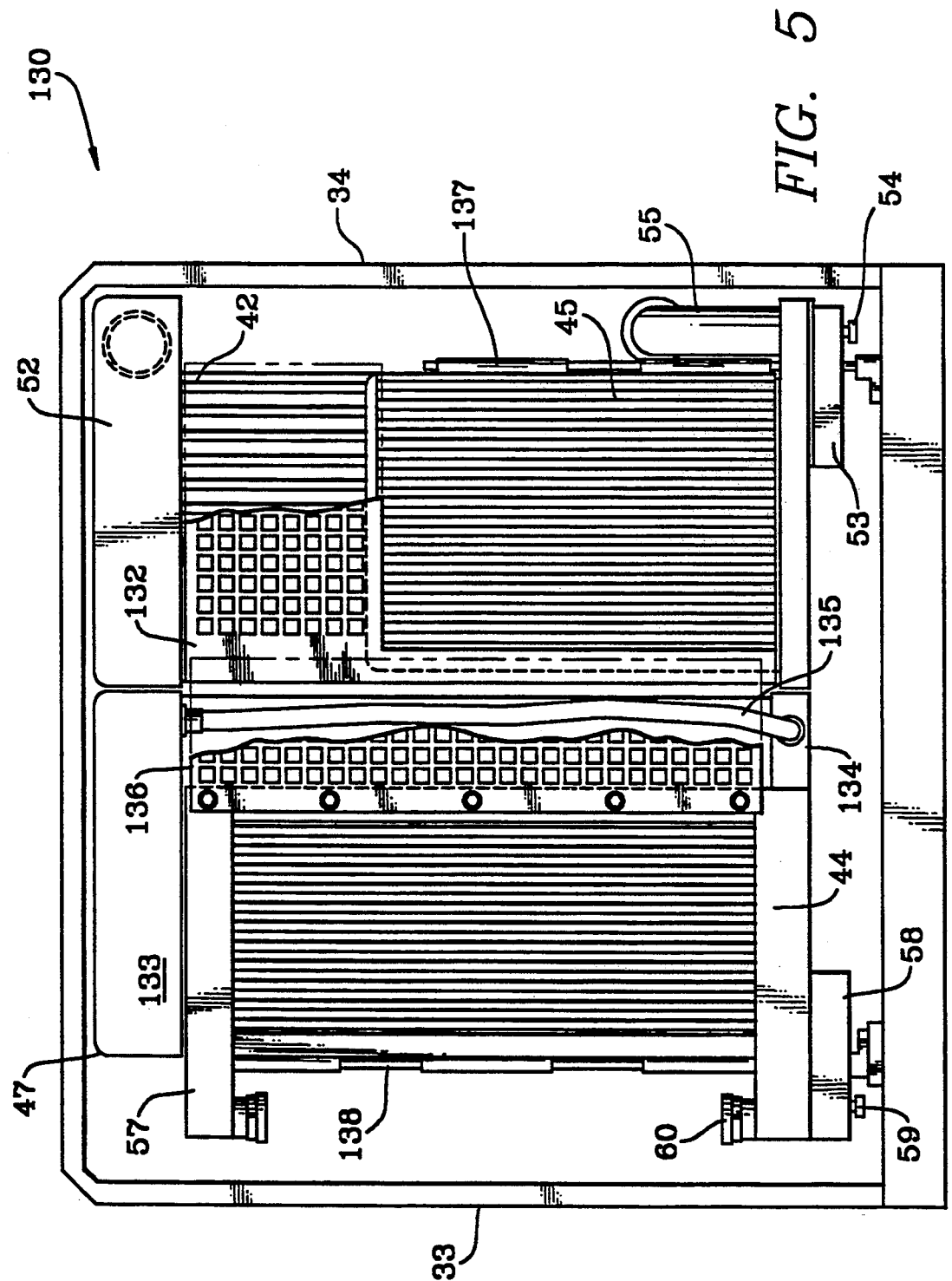
FIG. 5 is a partial, enlarged view of FIG. 3 illustrating a cooling system configuration according to the present invention, the compressor having rear access panels removed.
Figure 6:
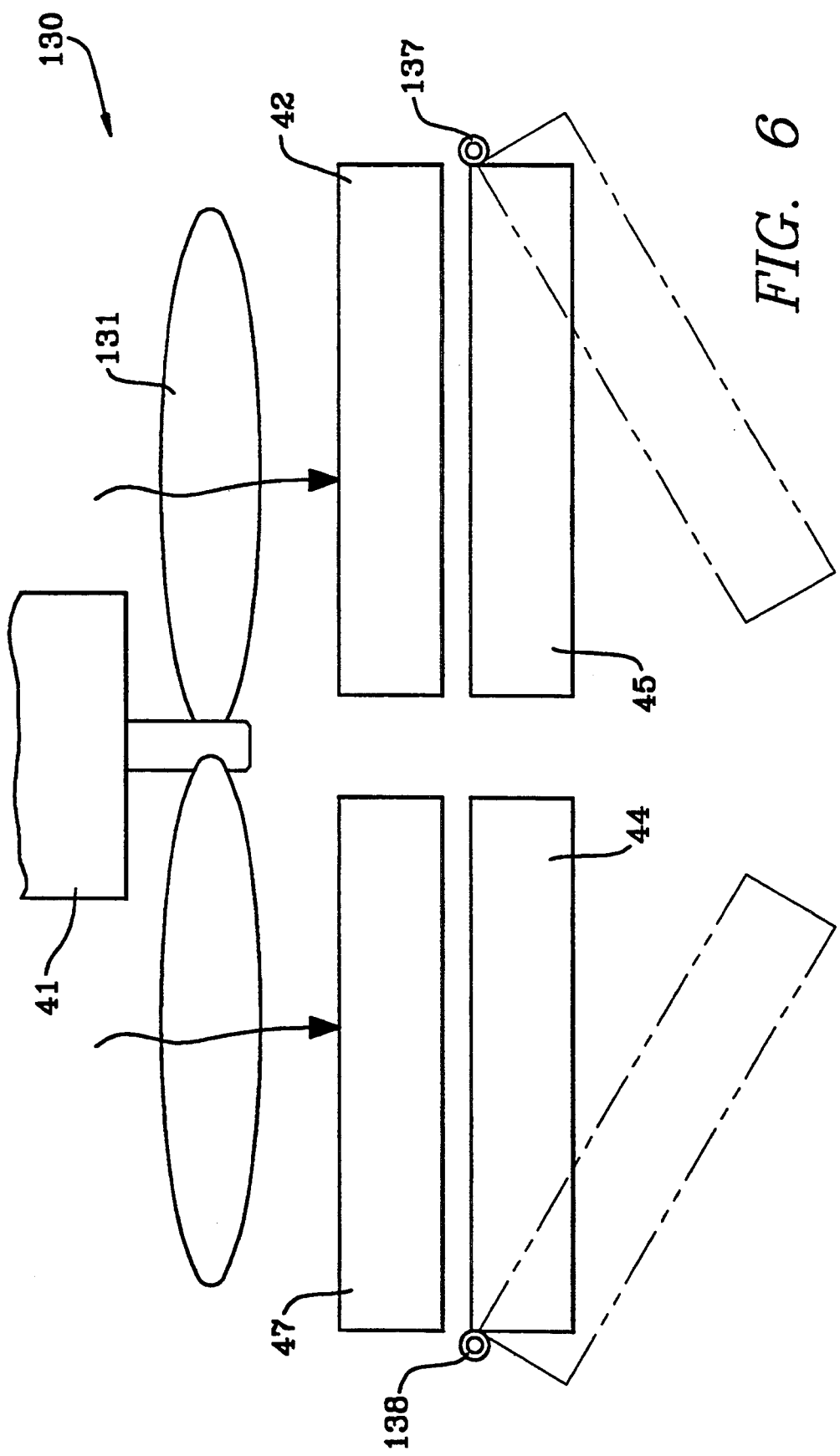
FIG. 6 is a partial, plan view of the cooling system illustrated in FIG. 5 detailing the location of individual cooler cores with respect to a cooling system fan.

FIGS. 4, 5 and 6 illustrate generally at 130, an air cooling system for an engine driven, multi-stage compressor, such as the portable, diesel-driven, centrifugal compressor 20, for example. The air cooling system 130 is operable to cool final stage compressed air to a temperature of about 55° F. above ambient temperatures, which thereby eliminates, in most instances, the need to incorporate an additional stand-alone aftercooler to supplement the main air cooling system of the compressor. The air cooling system 130 includes four main elements, namely, the intercooler 42, the aftercooler 44, the oil cooler 45, and the engine radiator 47. The cooling system 130 utilizes a design which critically positions the four coolers in predetermined locations within the compressor housing 24, and this critical cooler positioning permits the cooling system 130 to achieve the final stage compressed air temperature of about 55° F. above ambient temperatures.

As illustrated by FIGS. 4 and 6, the air cooling system 130 includes an engine-driven, 54" diameter fan 131 which provides an adequate cooling airstream across the four coolers. The fan 131 may be either a constant speed or a variable speed fan. In the case of a constant speed fan, the fan 131 is generally belt-driven and rotates at a fixed percentage of engine speed, e.g., at 1800 RPM engine speed, the fan speed would be 990 RPM with a fan pulley ratio of 0.55. In the case of a variable-speed fan 131, the fan is driven either by a multiple-speed clutch drive or a variable-transmission driver. As illustrated by FIG. 4, cooling air is drawn by the fan 131 through the suitably sized ambient air intakes 38, and the cooling air then flows from front to rear through the interior of the housing 24 removing heat generated by the airend 40, the engine 41, and other elements of the compressor. Thereafter, cooling air flows across the fan, and is pushed by the fan through the four cooling cores. After the cooling airstream has flowed across the cooling cores, it is directed vertically upward out of the housing 24 through the cooling air exhaust area in the top portion 29 of the housing 24.

As best seen by reference to FIGS. 4 and 6, the intercooler 42, the aftercooler 44, the oil cooler 45, and the engine radiator 47 are critically arranged in two series of banks, each bank comprising two cooling cores juxtaposed one to each other. In this regard, the intercooler 42 and the engine radiator 47 comprise the first bank which is positioned substantially adjacent to the fan 131 to receive the coolest cooling airstream. The aftercooler 44 and the oil cooler 45 comprise the second bank which receives warmer cooling air which has first passed through the first bank.

Cooling priority is given to the intercooler 42 and the radiator 47. In this regard, an operating limitation which would require that the compressor 20 be shut down is the temperature of the engine coolant, therefore, the engine radiator 47 must receive the coolest air possible. Additionally, and with respect to the compressed air system, the intercooler 42 has a higher cooling priority than the aftercooler 44. The intercooler prepares the air for entry into the second compressor stage 40B. To ensure efficient compressor operation, air entering the second stage 40B should be as close to ambient temperature as possible. The intercooler 42 cools the interstage air to within 25° F. of ambient temperature.

As illustrated by FIG. 5, the intercooler 42 receives hot discharge air from the compressor stage 1 at an intercooler top header portion 52. The hot compressed air flows downward through the intercooler core toward an intercooler discharge 55, accordingly, the hottest compressed air is located in the top header portion of the intercooler 42. The hot discharge air is cooled by the intercooler to within approximately 25° F. of the first stage inlet temperature. During this cooling process, water vapor is condensed, and a portion of the condensate is discharged into an intercooler bottom reservoir portion 53 and through a small drain orifice 54. Cooled and saturated interstage air then leaves the intercooler 42 at an intercooler discharge 55 and flows through the water separator 43. Testing has demonstrated that the cooling airstream which has already flowed through the top portion of the intercooler 42 is actually hotter than the oil flowing into the oil cooler 45. Therefore, the total height of the oil cooler 45 must not exceed about 60% the total height of the intercooler 42. In the preferred embodiment, the oil cooler 45 should not approach within 20" of the top of the intercooler.

Because of the placement of the oil cooler 45 with respect to the intercooler 42, a pressure balancing plate 132 is placed in the height void above the oil cooler 45 to prevent cooling air from flowing away from the oil cooler 45. During operation of the compressor 20 without the pressure balancing plate 132, as the cooling air passes through the top portion of the intercooler 42, the air seeks a low pressure path through the interior rear portion of the housing to the top of the package and out the cooling air exhaust, instead of flowing through the oil cooler 45. The pressure balancing plate 132 is suitably designed to exactly match the pressure drop across the oil cooler 45 at the desired airflow and velocity of the cooling airstream of the cooling system 130. Therefore, the pressure balancing plate 132 ensures that an adequate supply of cooling air flows across the oil cooler 45. In the preferred embodiment, the pressure balancing plate 132 defines apertures of approximately 1″ square. As best seen by reference to FIGS. 5 and 6, the oil cooler 45 is pivotally mounted on a hinge assembly 137 to permit the oil cooler to swing out for future maintenance.

The radiator 47 includes a top header portion 133 into which hot coolant from the engine 41 flows, and a bottom portion 134 from which cooled coolant flows back to the engine. Flow connected intermediate the top header portion 133 and the bottom portion 134 is a radiator bypass hose 135. A switch means S13 shuts down the compressor 20 when the temperature of the coolant exceeds a predetermined value.

As illustrated by FIG. 5, the compressed air enters the aftercooler 44 at an upper portion 57, and flows in a downward direction within the aftercooler wherein which it is cooled to approximately 55° F. above ambient temperature. During this final cooling process, water vapor is condensed, and a portion of the condensate is discharged into an aftercooler bottom reservoir portion 58, and through a small drain orifice 59. Cooled and saturated second stage compressed air then flows from the aftercooler at an aftercooler discharge to the inlet of the receiver tank 46. The height of the aftercooler 44 is restricted by the location of the top header portion 133 of the radiator 47, the aftercooler being positioned under the top header portion. The width of the aftercooler is limited to permit access and maintenance to the radiator bypass hose 135. A pressure balancing plate 136, which functions in the same manner as the pressure balancing plate 132, is placed in the width void adjacent to the aftercooler 44, in front of the radiator bypass hose 135, to prevent cooling air from flowing away from the aftercooler. The pressure balancing plate 136 is suitably designed to exactly match the pressure drop across the aftercooler 44 at the desired airflow and velocity of the cooling airstream of the cooling system 130. In the preferred embodiment, the pressure balancing plate 136 defines apertures of approximately 1″ square. As best seen by reference to FIG. 6, the aftercooler 44 is pivotally mounted on a hinge assembly 138 to permit the aftercooler to swing-out for future maintenance.

The design of the air cooling system 130 permits the compressor 20 to produce final stage compressed air at temperatures approximately 55° F. above ambient temperature, ensures that the temperatures and objectives of each cooler core are met, conserves space to permit the air cooling system components to be mounted in as small packages as possible, and permits access to the cooling cores for future maintenance.

FIG. 7 provides a functional block diagram of a compressor electronic control system 140 which includes the microprocessor-based electronic controller which provides complete control of the compressor 20. The electronic control system 140 includes an electronic control module 142, an alphanumeric display module 143, and an electronic gauge module 144. The electronic control module 142 includes the electronic controller and various primary control switches and indicator lamps.

The alphanumeric display module 143 includes a message display and a digital display to provide a user with diagnostic information, operational status messages, and the name of a measured parameter being displayed in the digital display.

The electronic gauge module 144 includes a plurality of lighted liquid crystal display (LCD) bar graph units which may display such information as the amount of fuel in tanks, engine oil pressure, engine coolant temperature, and service air temperature.

The electronic controller provides a full complement of diagnostics and automatic shutdowns to protect the compressor 20 from damage when in need of maintenance or in the event of malfunction. For example, if the temperature measured at temperature sensor RT7 exceeds a predetermined value, the compressor 20 is shut down by the electronic controller. When the electronic controller detects an operating parameter at a dangerously high or low level or if a critical sensor is malfunctioning, the machine will be automatically unloaded and stopped with the cause of the shutdown shown on the message display.

While this invention has been illustrated and described in accordance with a preferred embodiment, it is recognized that variations and changes may be made therein without departing from the invention as set forth in the following claims.

Having described the invention, what is claimed is:

1. An air cooling system for an engine driven, multistage compressor, the cooling system comprising:
   a fan;
   a housing which encloses the engine driven, multistage compressor, the housing having a forward portion, a rear portion, a cooling area exhaust, and an ambient air intake;
   an intercooler having a predetermined height dimension, the intercooler receiving heated, compressed, interstage air;
   an oil cooler having a predetermined height dimension which is substantially less than the height dimension of the intercooler;
   first means for balancing pressure, and wherein the first pressure balancing means is disposed in a void defined by the height differential between the intercooler and the oil cooler, the first pressure balancing means matching a predetermined cooling airstream pressure drop across the oil cooler;
   an engine radiator; and
   an aftercooler which receives final stage compressed air, and wherein the intercooler, the oil cooler, the radiator, and the aftercooler are arranged in two banks, each bank comprising two cooling cores juxtaposed one to each other, the intercooler and the engine radiator defining the first bank which is positioned substantially adjacent to the fan, and the oil cooler and the aftercooler defining the second bank, and wherein the oil cooler is positioned behind the intercooler and the aftercooler is positioned behind the radiator.

2. An air cooling system, as claimed in claim 1, and wherein the first pressure balancing means is a plate having formed therein a plurality of apertures of approximately 1" square.

3. An air cooling system, as claimed in claim 1, and wherein the oil cooler is hingedly mounted on the housing.

4. An air cooling system, as claimed in claim 1, and wherein the engine radiator includes a top header portion into which flows hot cooling fluid from the engine, and a bottom portion from which cooled cooling fluid flows back to the engine, and flow connected intermediate the top and bottom radiator portions is a radiator bypass.

5. An air cooling system, as claimed in claim 4, and wherein the engine radiator has a predetermined width dimension and the aftercooler has a predetermined width dimension which is less than the width dimension of the engine radiator.

6. An air cooling system, as claimed in claim 5, further comprising:
  second means for balancing pressure, and wherein the second pressure balancing means is disposed in a void defined by the width differential between the radiator and the aftercooler, the second pressure balancing means matching a cooling airstream pressure drop across the aftercooler.

7. An air cooling system, as claimed in claim 6, and wherein the second pressure balancing means is a plate having formed therein a plurality of apertures of approximately 1" square.

8. An air cooling system, as claimed in claim 1, and wherein the aftercooler is hingedly mounted on the housing to permit the aftercooler to swing along a path of travel to facilitate maintenance of the air cooling system.

9. An air cooling system for an engine driven, multistage compressor, the cooling system comprising:
  fan means for providing a cooling airstream to the air cooling system;
  a housing which encloses the engine driven, multistage compressor, the housing having a forward portion, a rear portion, and a cooling area exhaust, the housing having formed therein an ambient air intake, and wherein the fan means draws cooling air through the ambient air intake, the cooling air flowing in a direction from front to rear within the housing, the cooling air exiting the housing through the cooling area exhaust;
  an intercooler having a predetermined height dimension, the intercooler receiving heated, compressed, interstage air;
  an oil cooler having a predetermined height dimension which is substantially less than the height dimension of the intercooler;
  first means for balancing pressure, and wherein the first pressure balancing means is disposed in a void defined by the height differential between the intercooler and the oil cooler, the first pressure balancing means matching a cooling airstream pressure drop across the oil cooler;
  an engine radiator having a predetermined width dimension, a top header portion into which flows hot cooling fluid from the engine, and a bottom portion from which cooled cooling fluid flows back to the engine, and flow connected intermediate the top and bottom radiator portions is a radiator bypass;
  an aftercooler which receives hot, compressed, final stage air, and which has a predetermined width dimension which is less than the width dimension of the engine radiator to permit access to the radiator bypass, and wherein the intercooler, the oil cooler, the radiator, and the aftercooler are arranged in two banks, each bank comprising two cooling cores juxtaposed one to each other, the intercooler and the engine radiator defining the first bank which is positioned substantially adjacent to the fan means to receive the coolest cooling airstream, and the oil cooler and the aftercooler defining the second bank which receives warmer cooling air which has first passed through the first bank, and wherein the oil cooler is positioned behind the intercooler and the aftercooler is positioned behind the radiator; and
  second means for balancing pressure, and wherein the second pressure balancing means is disposed in a void defined by the width differential between the radiator and the aftercooler, the second pressure balancing means matching a cooling airstream pressure drop across the aftercooler.

10. An air cooling system, as claimed in claim 9, and wherein the first pressure balancing means is a plate having formed therein a plurality of apertures of approximately 1" square.

11. An air cooling system, as claimed in claim 9, and wherein the oil cooler is hingedly mounted on the housing to permit the oil cooler to swing along a path of travel to facilitate maintenance of the air cooling system.

12. An air cooling system, as claimed in claim 9, and wherein the second pressure balancing means is a plate having formed therein a plurality of apertures of approximately 1" square.

13. An air cooling system, as claimed in claim 9, and wherein the aftercooler is hingedly mounted on the housing to permit the aftercooler to swing along a path of travel to facilitate maintenance of the air cooling system.

* * * * *